(12) United States Patent
Wang et al.

(10) Patent No.: US 11,928,052 B2
(45) Date of Patent: Mar. 12, 2024

(54) AUTOMATED TESTING OF MOBILE COMPUTING DEVICES

(71) Applicant: FMR LLC, Boston, MA (US)

(72) Inventors: Shijun Wang, Shanghai (CN); Matthew Sanchez, Portsmouth, NH (US); Shiwen Ge, Dalian (CN); Jiadong Shi, Dalian (CN); Yucai Yang, Dalian (CN); Peng Du, Dalian (CN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/868,638

(22) Filed: Jul. 19, 2022

(65) Prior Publication Data

US 2024/0028502 A1    Jan. 25, 2024

(51) Int. Cl.
*G06F 11/36* (2006.01)

(52) U.S. Cl.
CPC ...... *G06F 11/3688* (2013.01); *G06F 11/3684* (2013.01)

(58) Field of Classification Search
CPC .............. G06F 11/36–3696; G06F 9/451
See application file for complete search history.

(56) References Cited

U.S. PATENT DOCUMENTS

| | | | |
|---|---|---|---|
| 8,271,950 B2 * | 9/2012 | Bharadwaj | G06F 11/3676 717/124 |
| 8,811,196 B2 | 8/2014 | Huq et al. | |
| 9,088,430 B2 | 7/2015 | Huq | |
| 9,459,994 B2 | 10/2016 | Koneru et al. | |
| 9,665,473 B2 * | 5/2017 | Bs | G06F 11/3664 |
| 9,788,219 B1 | 10/2017 | Michel et al. | |
| 10,136,345 B2 | 11/2018 | Nitsan et al. | |
| 10,515,000 B2 | 12/2019 | Moretto et al. | |
| 10,672,013 B2 * | 6/2020 | Bs | G06F 11/368 |
| 11,570,274 B1 * | 1/2023 | Kinnunen | H04L 67/60 |
| 2007/0117560 A1 | 5/2007 | Pora et al. | |
| 2011/0004868 A1 * | 1/2011 | Bharadwaj | G06F 11/3676 717/124 |
| 2015/0278076 A1 * | 10/2015 | Bs | G06F 11/3664 714/38.1 |
| 2018/0018680 A1 * | 1/2018 | Bs | G06F 11/3664 |
| 2021/0117313 A1 * | 4/2021 | Geary | G06F 11/3495 |
| 2021/0397542 A1 * | 12/2021 | Seaton | G06N 3/08 |
| 2022/0067551 A1 * | 3/2022 | Wei | G06N 5/046 |

\* cited by examiner

*Primary Examiner* — Todd Aguilera
(74) *Attorney, Agent, or Firm* — Cesari and McKenna, LLP

(57) ABSTRACT

Methods and apparatuses are described for automated testing of mobile devices. A server establishes a connection with a client device via a high-latency connection. The server receives input from the client device comprising (i) a selection of mobile devices for testing and (ii) a selection of a test interaction. The server generates predicted interactions for each of the selected mobile devices using historical device interaction data. The server converts the predicted interactions into test scripts, each test script formatted for use with one of the selected mobile devices. The server deploys each test script for execution on the corresponding mobile device, and transmits results from the test script executions to the client device.

24 Claims, 6 Drawing Sheets

AUTOMATED TESTING OF MOBILE COMPUTING DEVICES

TECHNICAL FIELD

This application relates generally to methods and apparatuses, including computer program products, for automated testing of mobile computing devices.

BACKGROUND

In today's computing environment, developers of mobile device applications ('apps') must ensure that their application performs accurately and uniformly across dozens of different platforms. It is critical that mobile device applications are responsive and successfully execute no matter what platform a client device is using. As can be appreciated, mobile manual testing is irreplaceable when it comes to verifying the true performance of app functionality and validating a user's first impressions of a mobile application. Mobile manual testing also provides flexibility and enables simulation of real device/user interactions with mobile apps.

The sheer variety of available mobile computing devices (e.g., phones, tablets, etc.) on the market from a range of manufacturers, including multiple variations of hardware models, differing operating system (OS) versions, screen sizes and resolutions, form factors, carriers, and network customizations makes it difficult to access every single hardware device for the purpose of testing mobile applications to be deployed on these platforms. Even then, if a sufficient range of mobile hardware is available for testing, the testing procedure is often completely manual—meaning that an engineer, developer, user interface tester, or other human user must perform each application workflow individually on each mobile device. This results in significant testing overhead and delays in application acceptance and deployment to production.

In some cases, enterprises have developed mobile device labs where a plurality of mobile computing devices are located. Generally, these labs consolidate many different real non-rooted mobile computing devices (not simulators) in a single physical location so that they may be more easily and efficiently tested. However, this causes an additional challenge for application developers and testers that are in a physically remote location from the mobile device lab. For example, a mobile device lab could be located in the U.S. while a team of specialized app developers and testers may be located in India or China. The developers may utilize a browser front-end application to interact with the mobile computing devices and execute application tests. Due to the significant physical distance between the two locations, the network connection used by the developers to interact with the mobile device lab may suffer from significant latency that makes testing of the mobile devices in the lab inefficient or very time-consuming.

SUMMARY

Therefore, methods and systems are needed for enabling remote, automated testing of mobile computing devices over a high-latency network connection. The techniques described herein advantageously enable users to initiate a wide range of testing scenarios against one or more mobile computing devices in a remote location via a small number of commands, while advanced machine learning processes and devices connected to the mobile computing devices automatically predict subsequent device interactions and generate test scripts without requiring input from the remote user—thereby significantly improving the test efficiency and limiting delays that may be caused by latency between the user and the testing site.

The invention, in one aspect, features a system for automated testing of mobile computing devices. The system includes a server computing device with a memory for storing computer-executable instructions and a processor that executes the computer-executable instructions. The server computing device establishes a connection with a client computing device, the connection having a latency that exceeds a threshold latency. The server computing device receives input from the client computing device comprising (i) a selection of one or more mobile computing devices for testing and (ii) a selection of a test interaction for the selected mobile computing devices. The server computing device generates a plurality of predicted interactions for each of the selected mobile computing devices using historical device interaction data, the plurality of predicted interactions based upon one or more of: a type of the associated mobile computing device or the selected test interaction. The server computing device converts the plurality of predicted interactions into one or more test scripts, each test script formatted for use with one of the selected mobile computing devices. The server computing device deploys each test script for execution on the corresponding mobile computing device. The server computing device transmits results from one or more of the test script executions to the client computing device.

The invention, in another aspect, features a computerized method of automated testing of mobile computing devices. A server computing device establishes a connection with a client computing device, the connection having a latency that exceeds a threshold latency. The server computing device receives input from the client computing device comprising (i) a selection of one or more mobile computing devices for testing and (ii) a selection of a test interaction for the selected mobile computing devices. The server computing device generates a plurality of predicted interactions for each of the selected mobile computing devices using historical device interaction data, the plurality of predicted interactions based upon one or more of: a type of the associated mobile computing device or the selected test interaction. The server computing device converts the plurality of predicted interactions into one or more test scripts, each test script formatted for use with one of the selected mobile computing devices. The server computing device deploys each test script for execution on the corresponding mobile computing device. The server computing device transmits results from one or more of the test script executions to the client computing device.

Any of the above aspects can include one or more of the following features. In some embodiments, the client computing device is at a different geographical location than the server computing device. In some embodiments, a connection between the server computing device and the mobile computing devices has a latency that is below the threshold latency.

In some embodiments, each selected test interaction comprises an initial interaction with the selected mobile computing device. In some embodiments, generating a plurality of predicted interactions comprises executing an interaction prediction model trained on the historical device interaction data to predict one or more sequences of interactions that follow the initial interaction, each predicted sequence of interactions associated with a prediction likelihood value, and sorting the predicted sequences of interactions based upon the prediction likelihood value. In some embodiments, converting the plurality of predicted interactions into one or more test scripts comprises selecting one or more predicted sequences of interactions that have a prediction likelihood value over a predefined threshold value, and converting each of the selected sequences of interactions into a test script.

In some embodiments, converting the plurality of predicted interactions into one or more test scripts comprises, for each selected mobile computing device, identifying one or more technical characteristics of the selected mobile computing device, and generating a test script for the selected mobile computing device based upon the identified technical characteristics, the test script comprising a sequence of instructions that correspond to the plurality of predicted interactions. In some embodiments, the technical characteristics of the selected mobile computing device comprise an operating system of the selected mobile computing device, a hardware configuration of the selected mobile computing device, an application installed on the selected mobile computing device, or a user interface element of the selected mobile computing device.

In some embodiments, deploying each test script for execution on the corresponding mobile computing device comprises establishing a connection to the corresponding mobile computing device, transmitting the test script to the corresponding mobile computing device, and executing the test script on the corresponding mobile computing device to generate one or more test results. In some embodiments, the one or more test results comprise log data associated with execution of the test script. In some embodiments, the log data includes one or more errors raised by the mobile computing device during execution of the test script. In some embodiments, the server computing device transmits the log data to the client computing device for display.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
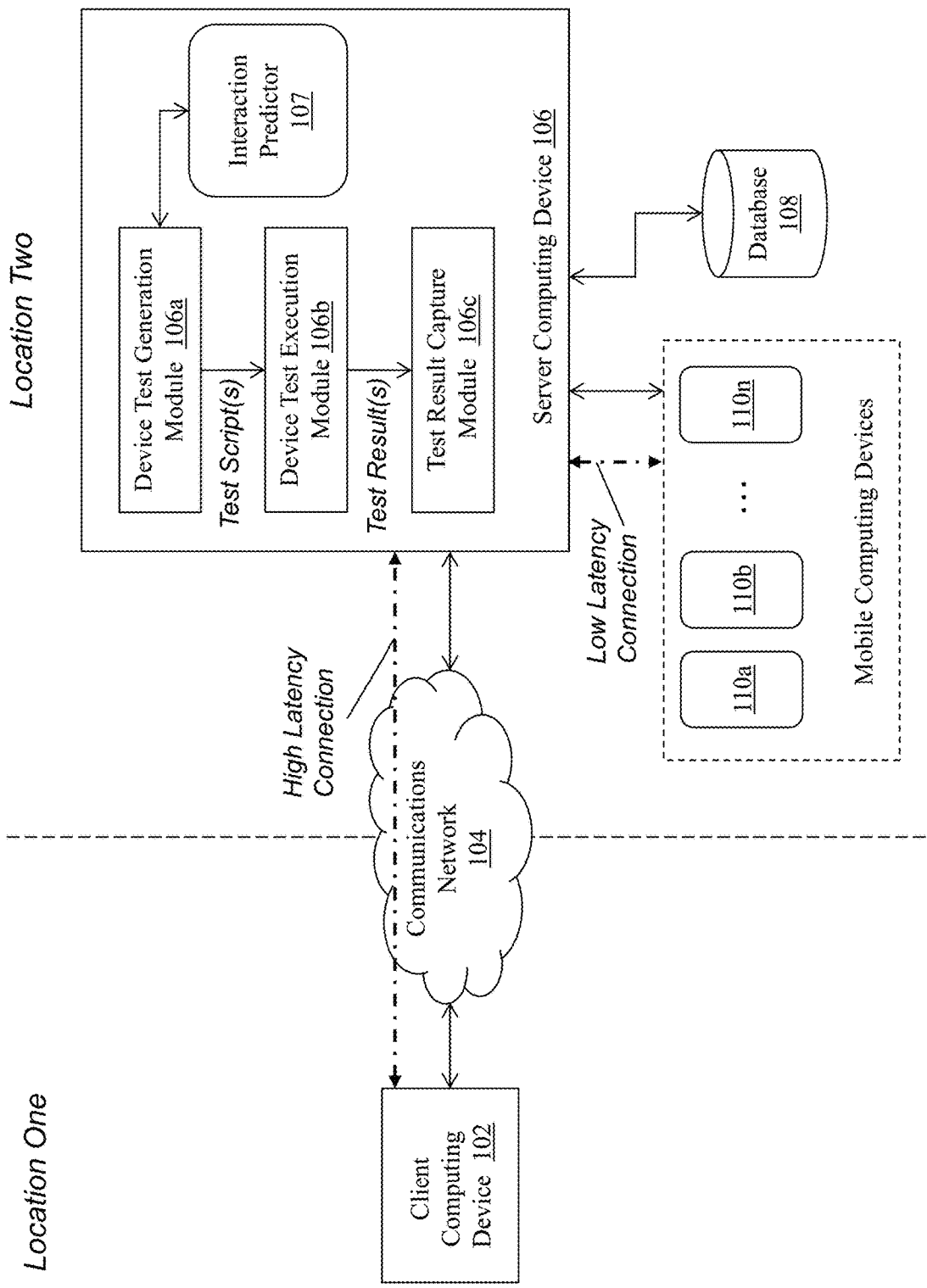
FIG. 1 is a block diagram of a system for automated testing of mobile computing devices.

FIG. 1 is a block diagram of a system 100 for automated testing of mobile computing devices. System 100 includes client computing device 102, communications network 104, server computing device 106 with device test generation module 106a, device test execution module 106b, and test result capture module 106c, interaction predictor 107, database 108, and a plurality of mobile computing devices 110a-110n for testing.

Client computing device 102 uses software and circuitry (e.g., processor, memory) to execute applications and to communicate with server computing device 106 via communications network 104 (e.g., using software installed on the device to connect to the Internet via communication circuitry, such as a network interface card or WiFi antenna) for the purpose of automated testing of mobile computing devices as described herein. Example client computing devices 102 can include, but are not limited to, a desktop computer, laptop computer, tablet, smartphone, mobile device or other similar types of computing devices.

Communication network 104 enables components of system 100 to communicate with each other using a packet-based protocol (e.g., IP). Network 104 may be a local network, such as a LAN, or a wide area network, such as the Internet. In some embodiments, network 104 is comprised of several discrete networks and/or sub-networks (including related routing, load balancing, and traffic metering hardware). As can be appreciated, client computing device 102 connects to server computing device 106 via network 104. In some embodiments, client computing device 102 is in a different geographical location than server computing device 106—which may require a significant number of intermediate computing devices and networking components between devices 102 and 106 in order to establish the connection. Also, in some cases, the physical distance between client computing device 102 and server computing device 106 is extensive. Either or both of these conditions may cause substantive delays in communication depending upon the intervening network architecture and/or physical distance—resulting in a high latency connection between devices 102 and 106 that may not be optimal for certain computing functions or applications, such as mobile device testing.

Server computing device 106 is a combination of hardware and software modules that includes specialized hardware and/or software modules that execute on a processor and interact with memory modules of server computing device 106, to receive data from database 108, to transmit data to database 108, and to communicate with other devices of the system 100 (e.g., client device 102, communications network 104, mobile computing devices 110a-110n) in order to perform functions for automated testing of mobile computing devices as described herein. As mentioned above, server computing device 106 includes device test generation module 106a, device test execution module 106b, test result capture module 106c, and interaction predictor 107 that execute on and/or interact with the processor of server computing device 106.

In some embodiments, device test generation module 106a, device test execution module 106b, test result capture module 106c, and interaction predictor 107 are specialized sets of computer software instructions programmed onto one or more dedicated processors in server computing device 106 and can include specifically-designated memory locations and/or registers for executing the specialized computer software instructions. Although device test generation module 106a, device test execution module 106b, test result capture module 106c, and interaction predictor 107 are shown in FIG. 1 as executing within the same server computing device 106, in some embodiments the functionality of modules 106a-106c and predictor 107 can be distributed among a plurality of server computing devices. As shown in FIG. 1, server computing device 106 enables device test generation module 106a, device test execution module 106b, test result capture module 106c and interaction predictor 107 to communicate with each other in order to exchange data for the purposes of performing the described functions. It should be appreciated that any number of computing devices, arranged in a variety of architectures, resources, and configurations (e.g., cluster computing, virtual computing, cloud computing) can be used without departing from the scope of the invention. Exemplary functionality of device test generation module 106a, device test execution module 106b, test result capture module 106c, and interaction predictor 107 is described in detail below.

Database 108 is a computing device (or in some embodiments, a set of computing devices) coupled to server computing device 106 and is configured to receive, generate, and store specific segments of data relating to the process of automated testing of mobile computing devices as described herein. In some embodiments, all or a portion of database 108 can be integrated with server computing device 106 or be located on a separate computing device or devices. Database 108 can comprise one or more databases configured to store portions of data used by the other components of system 100, as will be described in greater detail below.

Mobile computing devices 110a-110n are coupled to server computing device 106 for the purpose of deploying and executing automated tests of the device software and hardware functionality. Mobile computing devices 110a-110n can be devices of various type (i.e., have different hardware platforms, operating systems, form factors, and so forth) that are connected to server computing device 106 for the purposes of testing each of the different mobile computing devices 110a-110n. For example, one mobile computing device 110a might be an Apple® iPhone™ X smartphone, another mobile computing device 110b might be an Google® Pixel Slate™ tablet, and a third mobile computing device 102c might be an Amazon® Kindle Fire™ HD 10 tablet. It should be appreciated that system 100 can be configured with any number of mobile computing devices of varying hardware, software, and/or form factor. Exemplary mobile computing devices can include, but are not limited to, laptop computers, smartphones, tablets, smart watches, Internet-of-Things (IoT) devices, smart appliances, personal digital assistants, e-readers, and so forth.

In some embodiments, server computing device 106 connects to mobile computing devices 110a-110n using an application test server (not shown). An application test server is a computing device that provides one or more test automation software tools and/or management frameworks accessible by software installed at client computing device 102 and/or server computing device 106 for the execution of automation test scripts (e.g., code files that automatically execute features and functions of a software application under test on one or more of mobile computing devices 110a-110n). An exemplary software application under test can be a web-based application that is executed by mobile computing devices 110a-110n via a browser (e.g., Chrome™, Safari™, or other similar web browsers). Another exemplary software application under test can be a native application (also called an 'app') that is downloaded and installed on mobile computing devices 110a-110n for local device execution. It should be appreciated, however, that other types of software applications under test can be contemplated within the scope of invention. In one example, either server computing device 106 or the application test server can connect to each of mobile computing devices 110a-110n via an HTTP session in a browser and/or at an operating system level for a native application to receive commands for the execution of particular test scripts and to provide application data and test results in response to the requests.

Figure 2:
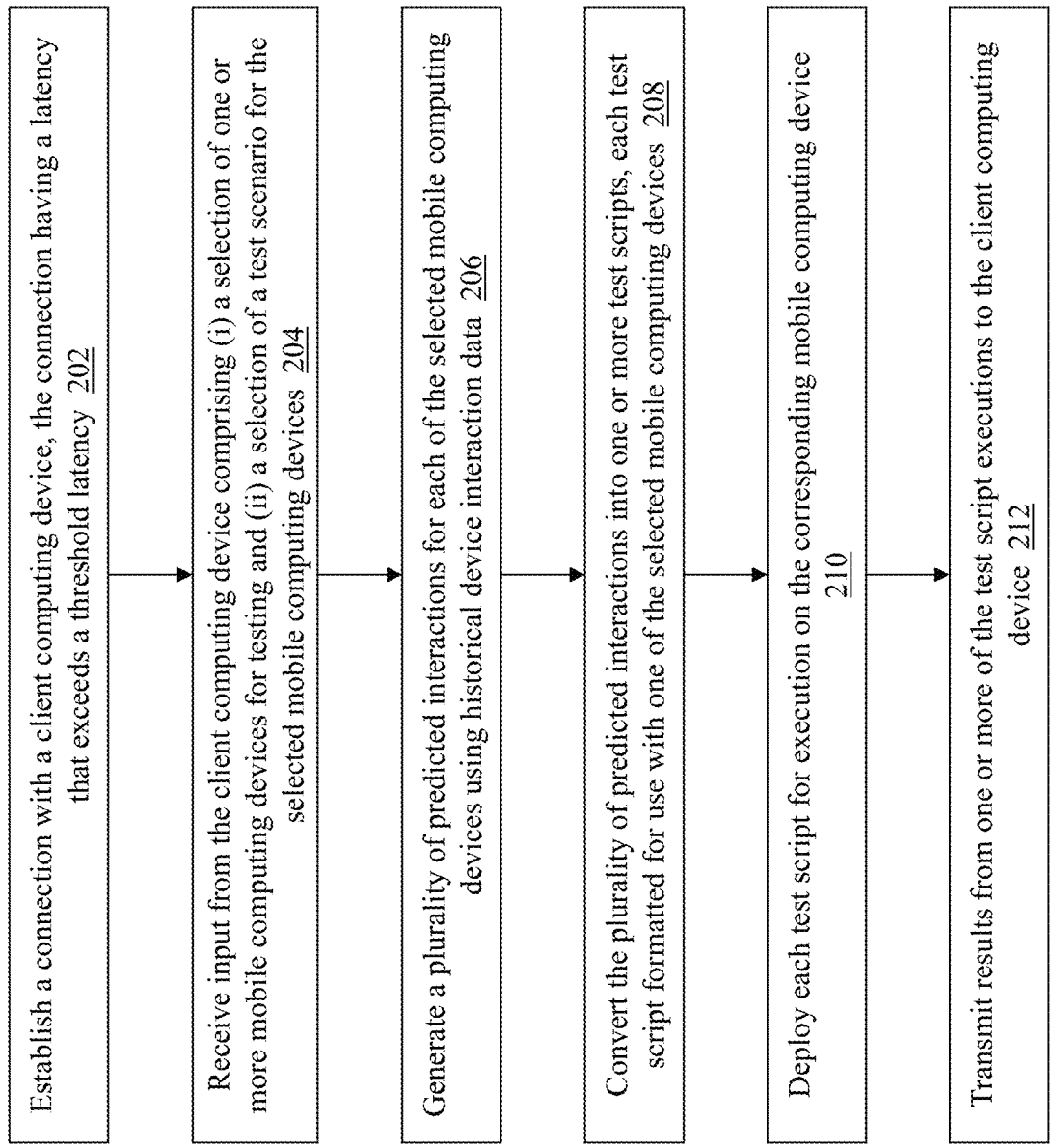
FIG. 2 is a flow diagram of a computerized method of automated testing of mobile computing devices.

FIG. 2 is a flow diagram of a computerized method 200 of automated testing of mobile computing devices, using the system 100 of FIG. 1. As explained above, to initiate execution of one or more automation test scripts, a connection is established (step 202) between client computing device 102 (which is located in a first geographical location) and server computing device 106 (located in a second geographical location) in order for a user at client computing device 102 to issue one or more commands to server computing device 106 via network 104 for execution of test scripts against mobile computing devices 110a-110n. For example, the user can launch an application on client computing device 102 to communicate with server computing device 106 via network 104 and establish a connection (such as a data communication session) with server computing device 106.

In the embodiment of FIG. 1, a significant physical distance exists between client computing device 102 and server computing device 106, which results in a network connection that has a latency which exceeds a threshold value (e.g., greater than two seconds). This high latency makes the system configuration suboptimal for performing mobile device testing that requires consistent communication between client computing device 102 and server computing device 106 (as in prior testing systems described above) in order to configure and execute tests against mobile computing devices 110a-110n. For example, each command initiated by a user at client computing device 102 (e.g., test device selection, test script preparation, test execution, test results collection and analysis, etc.) is subject to the latency and causes significant delay in the execution of such device tests.

To overcome the above-referenced limitations of a high-latency network connection, server computing device 106 advantageously generates and executes one or more test scripts automatically against one or more of mobile computing devices 110a-110n based upon, e.g., predicted device interactions identified from prior device testing of one or more of mobile computing devices 110a-110n. As can be appreciated, in these embodiments server computing device 106 carries out the test generation, execution, and test results collection without requiring back-and-forth communications with client computing device 102. Instead, the user at client computing device 102 selects one or more mobile computing devices 110a-110n for testing and selects a test interaction for each of the selected devices (in some cases, the test interaction may be different for different devices), then transmits this information to server computing device 106. Server computing device 106 generates the test scripts for execution based upon the information received from client computing device 102, automatically performs the mobile device testing, and returns the test results to client computing device 102 upon concluding the testing process. As a result, delays in test selection and configuration caused by back-and-forth communications over the high-latency network connection are eliminated—providing a more streamlined and efficient test execution process while also enabling the user at client computing device 102 to perform other tasks while the test generation and execution takes place (instead of being forced to provide input for a given step of the test generation and execution process, then wait for a response from server computing device 106 before providing input for the next step and waiting again).

Figure 3:
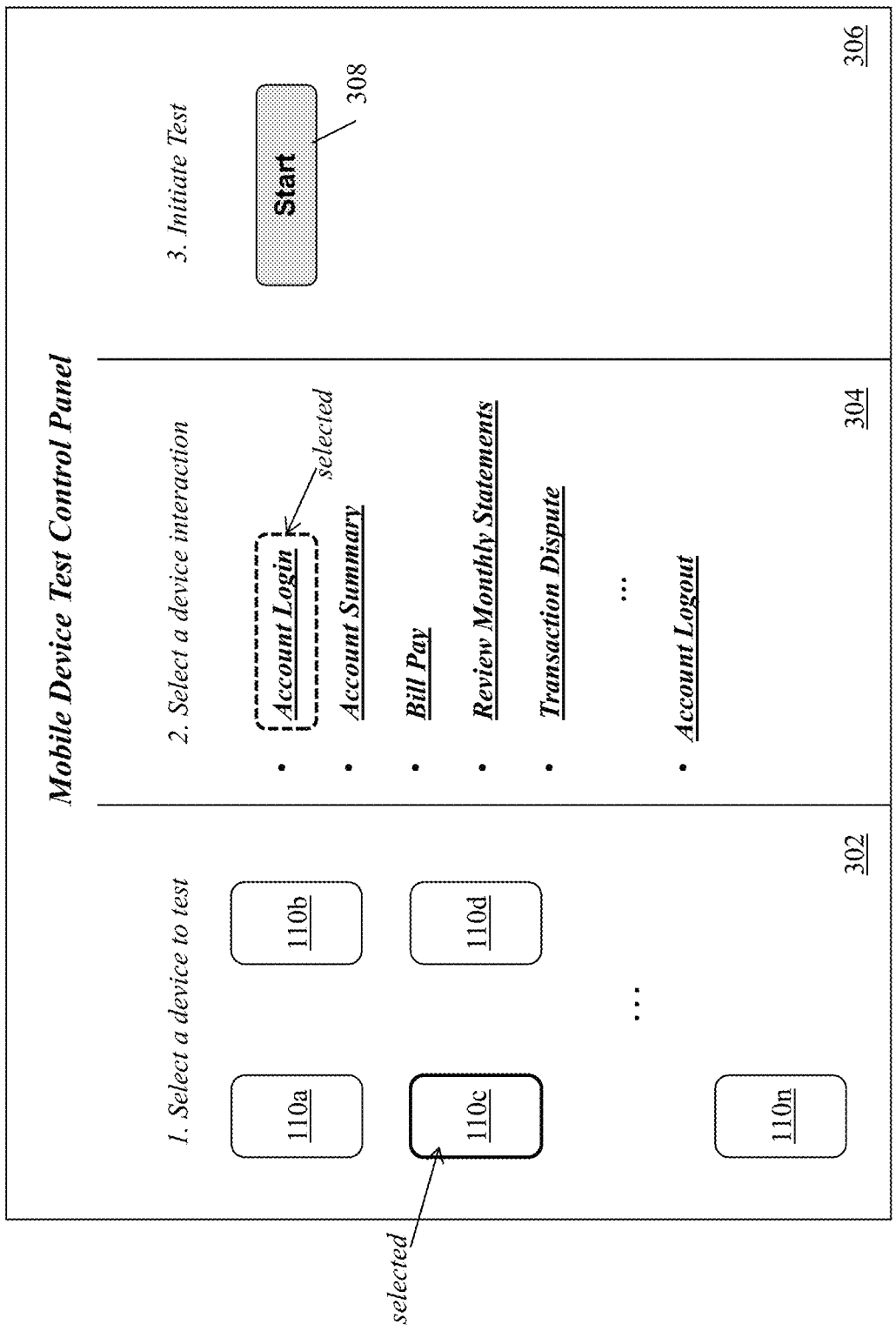
FIG. 3 is a diagram of an exemplary user interface generated on client computing device to provide for selection of mobile computing devices selection of a test interaction.

Continuing with FIG. 2, device test generation module 106a of server computing device 106 receives (step 204) input from client computing device 102, where the input comprises (i) a selection of one or more mobile computing devices 110a-110n for testing and (ii) a selection of a test interaction for the selected mobile computing devices. FIG. 3 is a diagram of an exemplary user interface 300 generated on client computing device 102 to enable a user of device 102 to provide a selection of mobile computing devices 110a-110n for testing and a selection of a test interaction for the selected mobile computing devices. In one embodiment, device test generation module 106a provides the user interface 300 in a browser application executing on client computing device 102. As shown in FIG. 3, indicia for one or more mobile computing devices 110a-110n available for testing at the second location are displayed in a first section 302 of the user interface 300, and the user of client device 102 can interact with the indicia to select a mobile computing device for testing. In one embodiment, the indicia may be images or icons corresponding to specific mobile computing devices 110a-100n, and the user can click on a particular image to select the associated mobile computing device for testing. For example, the user interface 300 shows that the icon for mobile device 110c has been selected by the user (e.g., the border of the icon is highlighted).

Next, indicia for one or more device interactions that can be performed during testing of the mobile computing device are displayed in a second section 304 of the user interface 300. In some embodiments, the indicia for the device interactions are generated by client computing device 102 and/or device test generation module 106a based upon the mobile device selected by the user as described above. For example, certain device interactions may not be available for certain devices, operating systems, form factors, etc. In this way, the user interface 300 dynamically displays indicia for device interactions based upon the particular selections made by the user with respect to mobile devices. As shown in FIG. 3, exemplary indicia of device interactions can include a list of application-specific functions (e.g., Account Login, Account Summary, Bill Pay, Review Monthly Statements, Transaction Dispute, Account Logout, etc.) that can be tested. It should be appreciated that device interactions are not limited to application-specific functions; in some embodiments, device interactions can include user gesture-based interactions, device hardware feature interactions, or other non-application specific interactions. As shown in FIG. 3, the user at client computing device 102 has selected the "Account Login" device interaction (as indicated by the dotted line around that item). After the user has selected a mobile computing device in section 302 and a device interaction in section 304, the user can initiate the device testing procedure. The user interface 300 includes a third section 306 that includes a start button 308. When the user clicks the start button, client computing device 102 transmits instructions to device test generation module 106a that include (i) the selected mobile device (e.g., 110c) and (ii) the selected device interaction (e.g., "Account Login") for execution of mobile device testing. In some embodiments, the user at client computing device 102 can select more than one mobile computing device 110a-110n for testing (e.g., by selecting a plurality of indicia from user interface 300) and/or select more than one device interaction for testing. For example, the user may want to test the "Bill Pay" device interaction on three different mobile computing devices 110a, 110b, 110d. The user can select each of the icons associated with those devices, select the "Bill Pay" interaction, and click the start button 308 to begin the testing.

Device test generation module 106a receives the input comprising the selected mobile computing devices and the selected device interactions from client computing device 102, and generates (step 206) a plurality of predicted interactions for each of the selected mobile computing devices. In one example, the predicted interactions comprise one or more interactions with the application/mobile computing device under test that logically follow the selected device interaction provided from client computing device 102. In the case where the selected device interaction is "Account Login," the application being tested may provide several different interactions that follow or result from the device interaction of logging into an account. As an example, after logging in a user may be able to interact with the application to, e.g., check an account balance, pay a bill, review monthly statements, or perform other functions or access other services provided by the application under test. Instead of requiring the user at client computing device 102 to specific each specific interaction to be tested (which would dramatically slow down the testing process due to the high latency connection), device test generation module 106a can leverage historical device interaction data for the application as input to predictive computer algorithms (e.g., machine learning-based models) to generate one or more workflows of predicted interactions with the application. As can be appreciated, the historical device interaction data can be stored in, e.g., database 108 and device test generation module 106a can retrieve all or a portion of the historical device interaction data for use in generating the predicted interactions.

In some embodiments, the historical device interaction data is collected over time by one or more server computing devices (not shown in FIG. 1) as users interact with a specific application and/or mobile computing device in a production environment. For example, when the application is installed on a particular mobile computing device (e.g., hardware model, operating system version, etc.), the application can include components that capture the workflow (e.g., sequence of interactions) as the user interacts with the application and mobile device. The mobile computing device can transmit the workflow information to a server computing device (e.g., device 106) for storage in database 108. Using this collected interaction data, server computing device 106 can determine various characteristics of the historical device interaction data, such as: frequency that certain interactions and/or sequences of interactions are performed by users, commonly-used features of the application (e.g., functions, input features, etc.), and so forth. Then, module 106a can train interaction predictor 107 using the historical device interaction data as input to be able to generate predicted device interactions for testing based upon, e.g., an initial device interaction performed in the application and/or on the mobile computing device.

In some embodiments, interaction predictor 107 comprises an artificial intelligence model configured using one or more deep learning-based algorithms to generate predictions of device interactions. For example, interaction predictor 107 can comprise one or more convolutional neural networks (such as a single neural network or an ensemble of networks) that receive input from device test generation module 106a, where the input corresponds to an initial device interaction. In some embodiments, module 106a provides a multidimensional vector corresponding to features of the initial device interaction. Interaction predictor 107 can use the multidimensional vector as input to generate, e.g., a set or sequence of predicted device interactions that follow from the initial device interaction. Each predicted device interaction and/or sequence of interactions can associated with a prediction likelihood value. For example, if predictor 107 generates a prediction likelihood value that is close to 1 (e.g., 0.95) for a given device interaction and/or sequence of interactions, it may indicate that the predicted device interaction and/or sequence of interactions is very likely to occur based upon the historical device interaction data. Module 106a can sort the predicted device interactions and/or sequences of interactions using the prediction likelihood value so that interactions and/or sequences of interactions with a higher likelihood of occurring may be arranged at the top of the set, and so forth. In some embodiments, module 106a can utilize the prediction likelihood value as a filter to select only those device interactions and/or sequences of device interactions where the prediction likelihood value is at or above a certain value—thereby generating test scripts and executing tests for certain device interactions and/or sequences of device interactions that are more likely to occur in production, which conserves testing time and resources.

Figure 4:
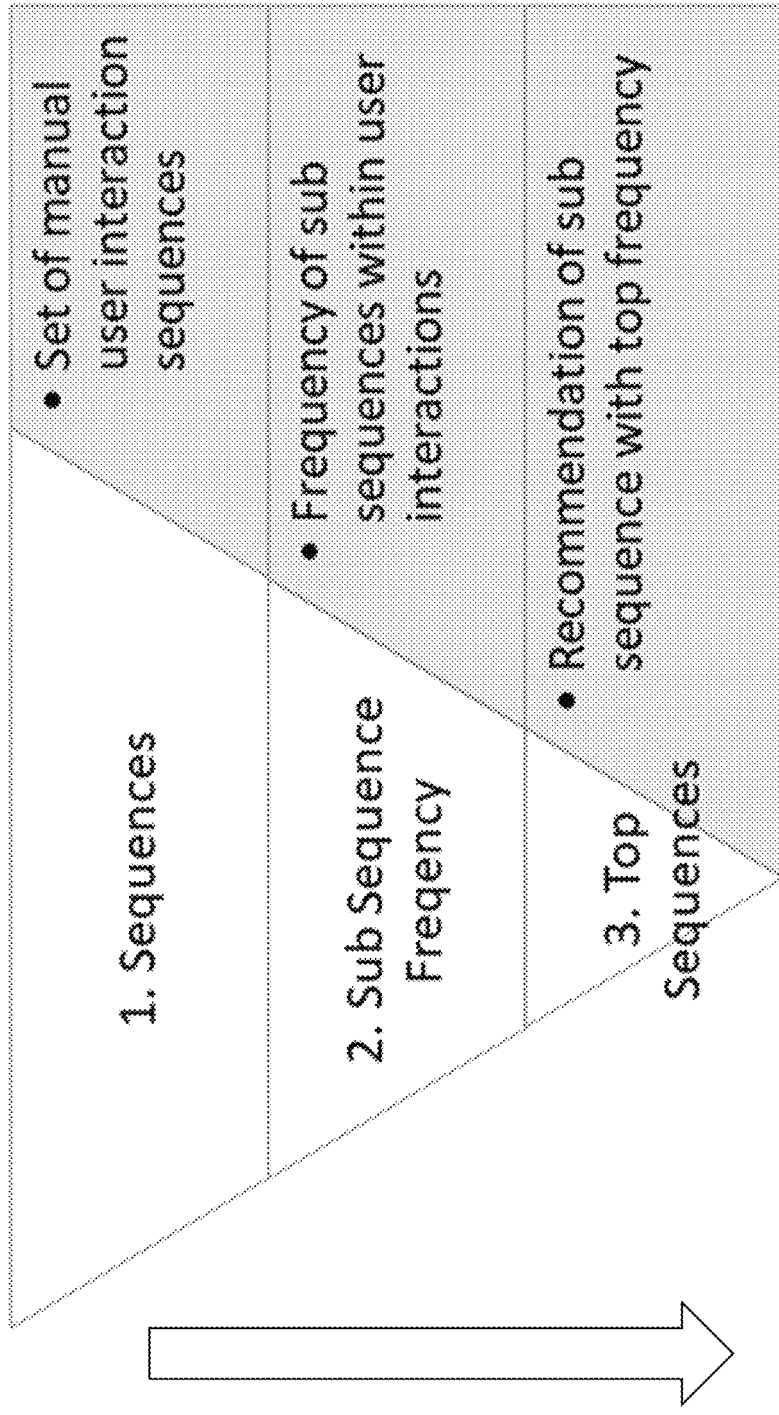
FIG. 4 is a flowchart of a process for generating interaction sequences for test scripts.

FIG. 4 is a flowchart of a process 400 for generating interaction sequences for test scripts. As shown in FIG. 4, interaction predictor 107 retrieves from database 108 a plurality of interactions captured from manual testing. These interactions are stored in the form of sequences, including an order of execution of the different actions. In this example, each interaction in the sequence is an action that a user performs on a mobile computing device (e.g., click a button, click a link, etc.). Each interaction is assigned a normalized name to ensure that every interaction can be recognized and executed universally without ambiguity by the device test execution module 106b. Examples of user interaction sequences are as follows:

Sequence 1=["Accounts", "Accounts/Transfer Money", "Accounts/Transfer Money/Back"],
Sequence 2=["Accounts", "Accounts/account detail/1", "Accounts/account detail/Back"],
Sequence 3=["Accounts", "Accounts/Transfer Money", "Accounts/Transfer Money/Back"],
Sequence 4=["Accounts", "Accounts/Transfer Money", "Accounts/Transfer Money/Back"].

Interaction predictor 107 then executes a sequential pattern mining algorithm on the user interaction sequences above to generate a set of subsequences. An exemplary sequential pattern mining algorithm used by interaction predictor 107 is described in J. Pei et al., "PrefixSpan: Mining Sequential Patterns Efficiently by Prefix-Projected Pattern Growth," published in Proceedings 17$^{th}$ International Conference on Data Engineering, Apr. 2-6, 2001, DOI: 10.1109/ICDE.2001.914830, which is incorporated herein by reference. Exemplary subsequences generated by the sequential pattern mining algorithm using the example sequences above are as follows:

Subsequence 1=["Accounts", "Accounts/Transfer Money", "Accounts/Transfer Money/Back", 3 ],
Subsequence 2=["Accounts", "Accounts/Transfer Money", 3],
Subsequence 1=["Accounts", 4].

where the last number in each subsequence corresponds to the frequency of the subsequence.

As can be appreciated, as the amount of manual interaction increases, the time required to extract the subsequences increases. Therefore, in some embodiments predictor 107 executes the sequential pattern mining algorithm periodically via a batch process (e.g., not in real time), and the frequency for different user interaction sequences and subsequences is stored ahead of time in database 110 before subsequent interaction recommendation. As a result, the time to execute the mining algorithm does not impact the time it takes for auto test script execution, and thus saves time for the user.

Once the subsequences and related frequencies are generated by predictor 107 and stored in database 110, device test generation module 106a retrieves corresponding frequencies of suffix sequences and subsequences with a prefix of the user's interaction request. For example, if a user provides the prefix sequence of ["Accounts", "Accounts/Transfer Money"], device test generation module 106a can retrieve one or more suffix sequences that correspond to, e.g., top recommended sequences based upon the frequency (such as ["Accounts", "Accounts/Transfer Money", "Accounts/Transfer Money/Back"] which as a frequency of 3). In some embodiments, a higher frequency can indicate an interaction sequence that is performed more often or is more common, so device test generation module 106a can retrieve the suffix sequences from these highly-performed interaction sequences. After the suffix sequence(s) are retrieved, device test generation module 106a generates one or more test scripts based upon the prefix and suffixes, etc. For different testing scenarios, device test generation module 106a and/or client device 102 can provide different prefix sequence(s) to retrieve different suffix sequence(s). In some embodiments, device test generation module 106a can provide criteria for retrieval of suffix sequences (e.g., top sequences with a minimum or maximum sequence length, etc.). As a result, device test generation module 106a can quickly and efficiently assemble many different test scripts and test cases automatically that reflect a spectrum of real-world user interactions.

Figure 5:
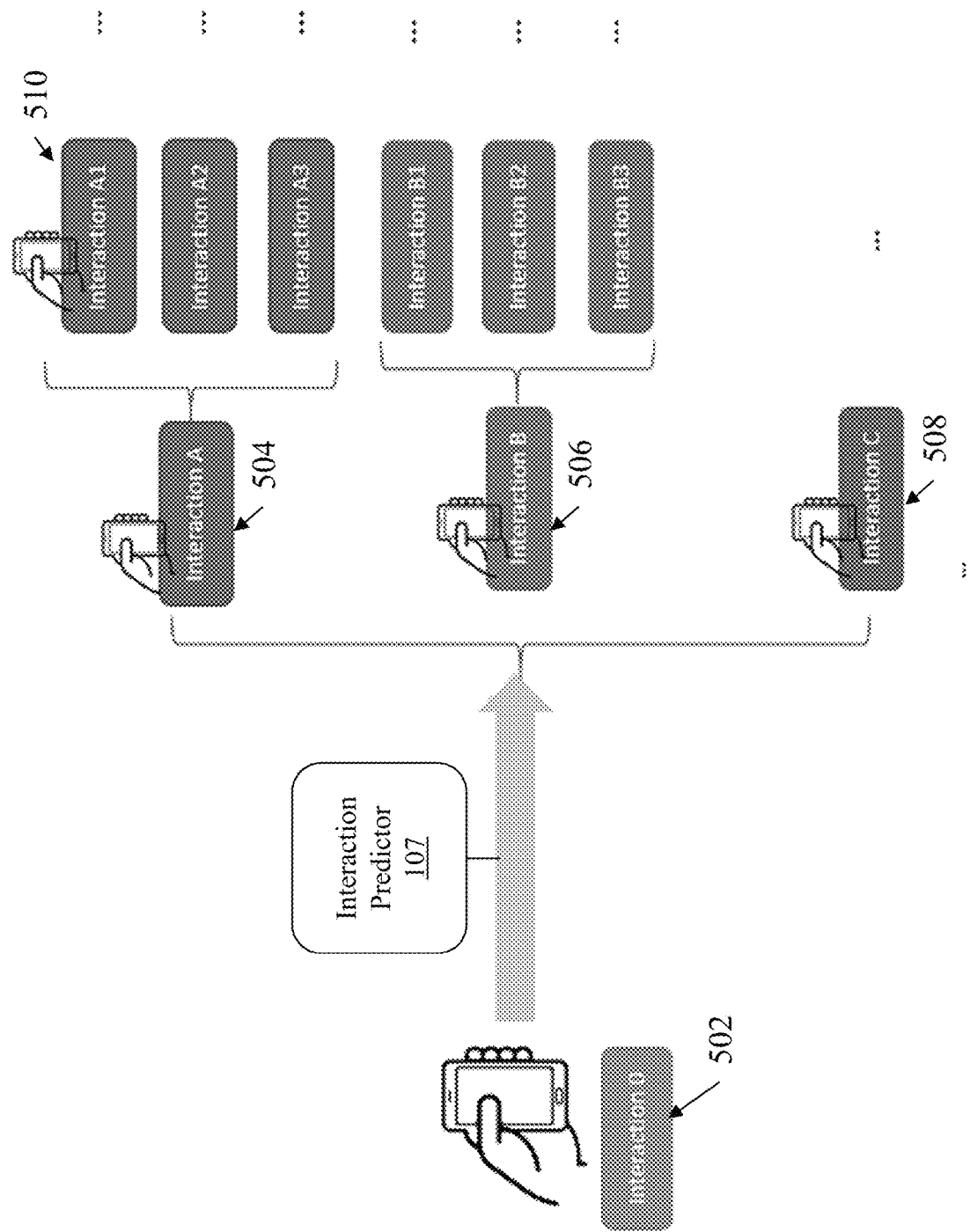
FIG. 5 is a diagram of an exemplary predicted interaction tree generated by interaction predictor.

In another example, interaction predictor 107 can utilize a tree structure to generate test scripts and interaction sequences. FIG. 5 is a diagram of an exemplary predicted interaction tree generated by interaction predictor. As shown in FIG. 5, interaction predictor 107 receives as input an initial device interaction 502 (Interaction 0) that corresponds to a device interaction selected by user of client computing device 102 as described previously. Interaction predictor 107 uses the historical device interaction data to predict a plurality of subsequent device interactions—such as 504 (Interaction A), 506 (Interaction B), 508 (Interaction C)—that, e.g., are likely to directly follow Interaction or are potential next actions by a user starting from Interaction 0. Then, for each of these subsequent predicted interactions, interaction predictor 107 can predict one or more further interactions such as 510 (Interaction A1) that follow from one or more of the subsequent interactions. As can be appreciated, the result of processing by interaction predictor 107 is a hierarchical data structure where the path from the root node (e.g., Interaction through each level of the data structure to an ending leaf node (e.g., Interaction A1) corresponds to a particular application/mobile device workflow that can be tested. For example, as shown in FIG. 3, a particular workflow may comprise:

Interaction 0 (root) Interaction A→*Interaction A1 where each interaction, when performed against the application and/or mobile computing device under test, causes the application/mobile computing device to change to another state (e.g., screen, function), update appearance, retrieve data, etc.

After receiving the predicted device interactions and sequences from interaction predictor 107, device test generation module 106a converts (step 208) the plurality of predicted interactions and sequences into one or more test scripts, each test script formatted for use with one of the selected mobile computing devices 110a-110n. In some embodiments, module 106a extracts each workflow from the predicted device interaction tree and/or sequences and subsequences stored in database 110 and generates a device-agnostic application test script based upon the extracted workflow. Continuing with the example above, module 106a can convert the following workflow:

Interaction 0 (root)→Interaction A→Interaction A1 into the following exemplary device-agnostic application test script:

START
1. [Interaction 0]
2. [Interaction A]
3. [Interaction A1]
. . .
END

In some embodiments, module 106a generates the device-agnostic application test script using a format understandable to human users (e.g., Cucumber™ available from cucumber.io) and depending upon the particular mobile computing device(s) selected by the user at client computing device 102, module 106a converts the human-readable test script into one or more programmatic test scripts (e.g., C#, Java™, Javascript™, Python, etc.) that can be executed on one of the corresponding mobile computing devices 110a-110n.

Figure 6:
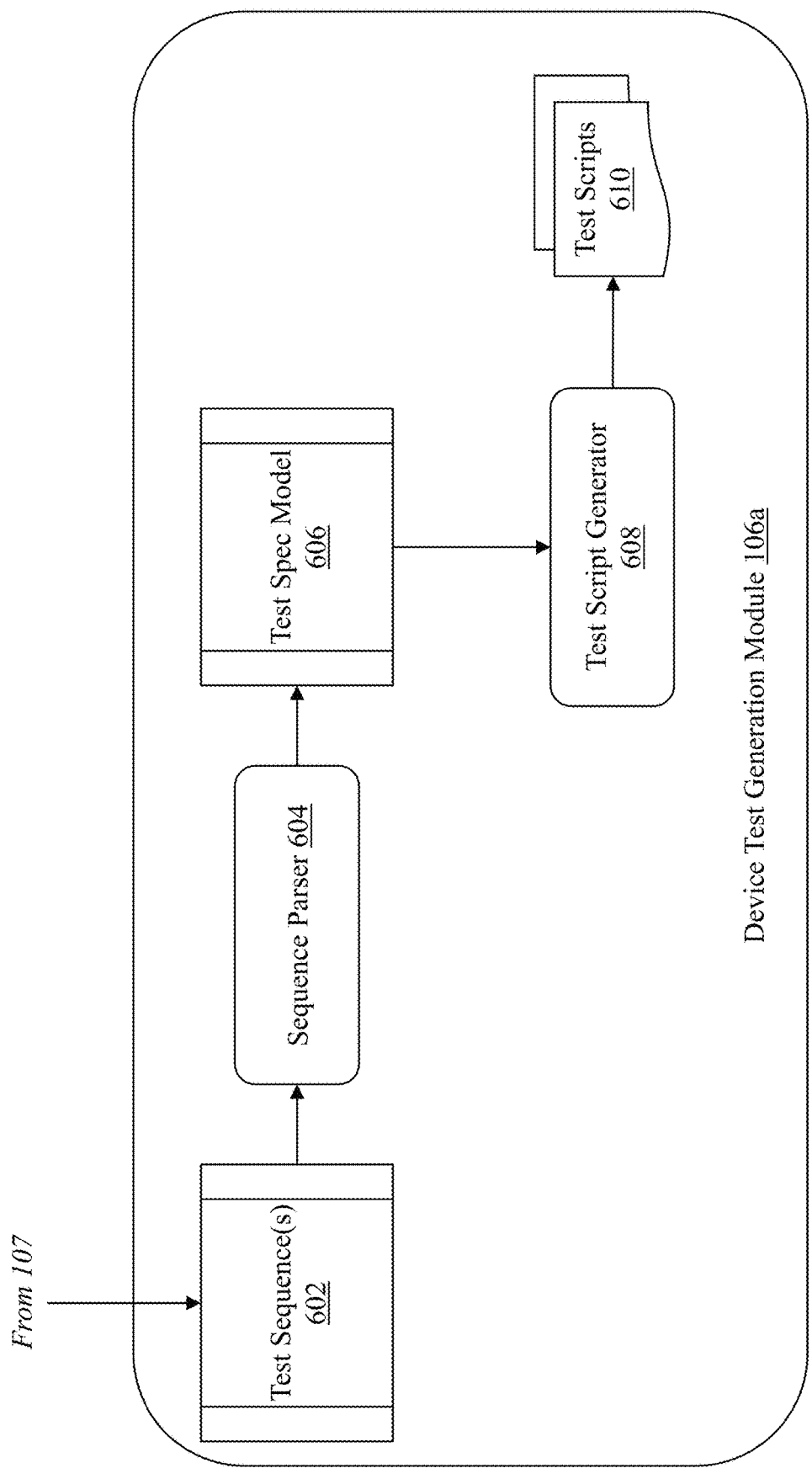
FIG. 6 is a detailed block diagram of test script generation module depicting specific computing modules and functions for creation of test scripts.

In some embodiments, module 106a performs test script generation using an automated process. FIG. 6 is a detailed block diagram of test script generation module 106a depicting specific computing modules/functions 602, 604, 606, 608 for creation of test scripts 610. As shown in FIG. 6, device test generation module 106a receives one or more test sequence(s) 602 from interaction predictor 107. Module 106a executes sequence parser 604 on the test sequence(s) 602 to create a test specification model 606 that represents all of the test sequence information. Then, module 106a executes test script generator 608 on the test specification model 606 to generate the test script(s) 610. An exemplary workflow that can be implemented in test script generator 608 to automatically create the test scripts is Acceptance-Mark, an open-source test generation engine available at github.com/bizz84/AcceptanceMark and which is further described in A. Bizotto, "Auto-generate your Xcode tests with AcceptanceMark," Sep. 26, 2016, available at medium.com/ios-os-x-development/auto-generate-your-xcode-tests-with-acceptancemark-a9421adfdaa2, which is incorporated herein by reference.

An example of the test script generation process is provided below:

In this example, a mobile device user interface can comprise a Notification button which, when activated, takes the user to a Notification Settings screen and ToggleOn is a button which toggles notifications on for the user. An exemplary interaction sequence might be:

[["More", "More/Notification", "More/Notification/ToggleOn"], 3]

Test script generation module 106a can execute the test generation algorithm to create the following test sequence in Swift XCTest for iOS:

let notification=app.buttons["Notification"]
syncElement(element:notification, in:testCase) notification.tap( )
let notification=app.buttons["ToggleOn"]
syncElement(element:notification, in:testCase) notification.tap( )

In some embodiments, during generation of the test script, module 106a identifies one or more technical characteristics of the mobile computing device(s) selected for testing by the user of client computing device 102 and customizes the test script according to the technical characteristics. For example, certain mobile computing devices may or may not have a given technical capability or feature (e.g., hardware/software input devices, operating system functions, user interface elements, etc.). In order to generate a test script that can be successfully executed on a specific mobile computing device, module 106a can adjust the test script for that device to account for the particular technical characteristics. In some embodiments, the technical characteristics of the selected mobile computing device can comprise an operating system of the selected mobile computing device, a hardware configuration of the selected mobile computing device, an application installed on the selected mobile computing device, or a user interface element of the selected mobile computing device.

Module 106a transmits the generated test script(s) to device test execution module 106b, and module 106b deploys (step 210) each test script for execution on the corresponding mobile computing device. For example, module 106b determines that the user at client computing device 102 has selected a particular make/model/OS version of mobile computing device for testing and module 106b identifies one of the mobile computing devices (e.g., device 110b) that matches the selected device. Module 106b establishes a connection to the corresponding mobile computing device 110b and deploys the generated test script to device 110b. Module 106b (alone or in conjunction with an automation testing framework such as Appium™ available at appium.io) executes the deployed test script on an application installed on device 110b—resulting in the predicted device interactions being executed against the application and test results (e.g., test status, log data, returned values, etc.) being transmitted to test result capture module 106c. For example, the log data generated from the test script execution may include one or more errors raised by mobile computing device 110b during execution of the test script.

Once each of the generated test scripts is executed and results are obtained, test result capture module 106c transmits (step 212) test results from one or more of the test script executions to client computing device 102. In some embodiments, module 106c analyzes the test results and determines whether additional test scripts may need to be executed before returning the results to client computing device 102. For example, one or more of the test scripts may not complete successfully (e.g., due to interruption of network connection between module 106b and mobile device under test) or return an error that requires the test script to be re-run. Module 106c can instruct device test execution module 106b to re-deploy and re-execute the corresponding test script on the selected mobile computing device prior to sending test results back to client computing device 102. Advantageously, this automated process enables the test script to be successfully executed and meaningful test results obtained before returning the test results to client computing device 102, thereby avoiding repeated communications over the high-latency network connection which slows down the testing process. When the test results are returned to client computing device 102, user at client computing device 102 can analyze the results and, e.g., select other devices and/or device interactions for testing, and so forth.

As can be appreciated from the above description, the methods and systems described herein beneficially provide for streamlined, automated, and efficient mobile computing device testing—particularly in the circumstances where (i) an engineer or developer is located in a geographically remote location from the location of the mobile devices being tested and/or (ii) a network connection between the engineer and the mobile computing devices being tested is at or above a defined latency threshold which renders manual mobile testing cumbersome and time-consuming. Instead of requiring the engineer to manually submit each device interaction in a given application testing workflow individually over the high-latency network connection and waiting for a response from the testing center before continuing to the next interaction, the techniques described herein enable the engineer to perform complex, multi-interaction mobile device testing with fewer commands—thereby saving the engineer time and providing actionable test results for a wide range of device interaction scenarios.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOW), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method of automated testing of mobile computing devices, the method comprising:
    establishing, by a server computer, a connection with a client computing device, the connection having a latency that exceeds a threshold latency;
    receiving, by the server computer, input from the client computing device comprising (i) a selection of one or more mobile computing devices for testing and (ii) a selection of a test interaction for the selected mobile computing devices;
    generating, by the server computer, a plurality of predicted interactions for each of the selected mobile computing devices using historical device interaction data and the selection of the test interaction, the plurality of predicted interactions based upon the selected test interaction, the plurality of predicted interactions comprising a hierarchical data structure where each path from a root node of the hierarchical data structure to a leaf node of the hierarchical data structure comprises a workflow to be tested,
    wherein the historical device interaction data comprises a plurality of interactions captured from manual testing,
    the server computer executes a sequential pattern mining algorithm on the historical device interaction data to generate a set of interaction subsequences each associated with an occurrence frequency, and
    the server computer identifies one or more of the interaction subsequences that have one or more prefix interactions that correspond to the selection of the test interaction and selects one or more suffix interactions of the identified interaction subsequences based upon the prefix interactions;
    converting, by the server computer, the plurality of predicted interactions into one or more device-specific test scripts, each device-specific test script formatted for use with one of the selected mobile computing devices, comprising: extracting a plurality of workflows from the hierarchical data structure, generating a device-agnostic application test script for each extracted workflow, and converting each device-agnostic application test script into a device-specific test script for execution by one of the selected mobile computing devices;
    deploying, by the server computer, each device-specific test script for execution on the corresponding mobile computing device; and
    transmitting, by the server computer, results from one or more of the device-specific test script executions to the client computing device.

2. The method of claim 1, wherein the client computing device is at a different geographical location than the server computer.

3. The method of claim 1, wherein a connection between the server computer and the mobile computing devices has a latency that is below the threshold latency.

4. The method of claim 1, wherein each selected test interaction comprises an initial interaction with a selected mobile computing device.

5. The method of claim 1, wherein generating a plurality of predicted interactions comprises:
    executing an interaction prediction model trained on the historical device interaction data to predict one or more sequences of interactions that follow the initial interaction, each predicted sequence of interactions associated with a prediction likelihood value, and
    sorting the predicted sequences of interactions based upon the prediction likelihood value.

6. The method of claim 5, wherein converting the plurality of predicted interactions into one or more device-specific test scripts comprises selecting one or more predicted sequences of interactions that have a prediction likelihood value over a predefined threshold value, and converting the workflow for each of the selected sequences of interactions into a device-specific test script.

7. The method of claim 1, wherein converting the plurality of predicted interactions into one or more device-specific test scripts comprises, for each selected mobile computing device:
    identifying one or more technical characteristics of the selected mobile computing device; and
    generating a device-specific test script for the selected mobile computing device based upon the identified technical characteristics, the device-specific test script comprising a sequence of instructions that correspond to one of the workflows in the hierarchical data structure.

8. The method of claim 7, wherein the technical characteristics of the selected mobile computing device comprise an operating system of the selected mobile computing device, a hardware configuration of the selected mobile computing device, an application installed on the selected mobile computing device, or a user interface element of the selected mobile computing device.

9. The method of claim 1, wherein deploying each device-specific test script for execution on the corresponding mobile computing device comprises establishing a connection to the corresponding mobile computing device, transmitting the device-specific test script to the corresponding mobile computing device, and executing the device-specific test script on the corresponding mobile computing device to generate one or more test results.

10. The method of claim 9, wherein the one or more test results comprise log data associated with execution of the device-specific test script.

11. The method of claim 10, wherein the log data includes one or more errors raised by the mobile computing device during execution of the device-specific test script.

12. The method of claim 11, wherein the server computer transmits the log data to the client computing device for display.

13. A system for automated testing of mobile computing devices, the system comprising a server computing device with a memory for storing computer-executable instructions and a processor that executes the computer-executable instructions to:
   establish a connection with a client computing device, the connection having a latency that exceeds a threshold latency;
   receive input from the client computing device comprising (i) a selection of one or more mobile computing devices for testing and (ii) a selection of a test interaction for the selected mobile computing devices;
   generate a plurality of predicted interactions for each of the selected mobile computing devices using historical device interaction data and the selection of the test interaction, the plurality of predicted interactions based upon the selected test interaction, the plurality of predicted interactions comprising a hierarchical data structure where each path from a root node of the hierarchical data structure to a leaf node of the hierarchical data structure comprises a workflow to be tested,
   wherein the historical device interaction data comprises a plurality of interactions captured from manual testing,
   the server computing device executes a sequential pattern mining algorithm on the historical device interaction data to generate a set of interaction subsequences each associated with an occurrence frequency, and
   the server computing device identifies one or more of the interaction subsequences that have one or more prefix interactions that correspond to the selection of the test interaction and selects one or more suffix interactions of the identified interaction subsequences based upon the prefix interactions;
   convert the plurality of predicted interactions into one or more device-specific test scripts, each device-specific test script formatted for use with one of the selected mobile computing devices, comprising: extracting a plurality of workflows from the hierarchical data structure, generating a device-agnostic application test script for each extracted workflow, and converting each device-agnostic application test script into a device-specific test script for execution by one of the selected mobile computing devices;
   deploy each device-specific test script for execution on the corresponding mobile computing device; and
   transmit results from one or more of the device-specific test script executions to the client computing device.

14. The system of claim 13, wherein the client computing device is at a different geographical location than the server computing device.

15. The system of claim 13, wherein a connection between the server computing device and the mobile computing devices has a latency that is below the threshold latency.

16. The system of claim 13, wherein each selected test interaction comprises an initial interaction with a selected mobile computing device.

17. The system of claim 13, wherein generating a plurality of predicted interactions comprises:
   executing an interaction prediction model trained on the historical device interaction data to predict one or more sequences of interactions that follow the initial interaction, each predicted sequence of interactions associated with a prediction likelihood value, and
   sorting the predicted sequences of interactions based upon the prediction likelihood value.

18. The system of claim 17, wherein converting the plurality of predicted interactions into one or more device-specific test scripts comprises selecting one or more predicted sequences of interactions that have a prediction likelihood value over a predefined threshold value, and converting the workflow for each of the selected sequences of interactions into a device-specific test script.

19. The system of claim 13, wherein converting the plurality of predicted interactions into one or more device-specific test scripts comprises, for each selected mobile computing device:
   identifying one or more technical characteristics of the selected mobile computing device; and
   generating a device-specific test script for the selected mobile computing device based upon the identified technical characteristics, the device-specific test script comprising a sequence of instructions that correspond to one of the workflows in the hierarchical data structure.

20. The system of claim 19, wherein the technical characteristics of the selected mobile computing device comprise an operating system of the selected mobile computing device, a hardware configuration of the selected mobile computing device, an application installed on the selected mobile computing device, or a user interface element of the selected mobile computing device.

21. The system of claim 13, wherein deploying each device-specific test script for execution on the corresponding mobile computing device comprises establishing a connection to the corresponding mobile computing device, transmitting the device-specific test script to the corresponding mobile computing device, and executing the device-specific test script on the corresponding mobile computing device to generate one or more test results.

22. The system of claim 21, wherein the one or more test results comprise log data associated with execution of the device-specific test script.

23. The system of claim 22, wherein the log data includes one or more errors raised by the mobile computing device during execution of the device-specific test script.

24. The system of claim 23, wherein the server computing device transmits the log data to the client computing device for display.

* * * * *

UNITED STATES PATENT AND TRADEMARK OFFICE
CERTIFICATE OF CORRECTION

| | | |
|---|---|---|
| PATENT NO. | : 11,928,052 B2 | Page 1 of 1 |
| APPLICATION NO. | : 17/868638 | |
| DATED | : March 12, 2024 | |
| INVENTOR(S) | : Shijun Wang et al. | |

It is certified that error appears in the above-identified patent and that said Letters Patent is hereby corrected as shown below:

In the Specification

Column 14, Line 65:
"tocol, Internet Protocol (IP), Voice over IP (VOW), a Peer-"
Should read:
--tocol, Internet Protocol (IP), Voice over IP (VOIP), a Peer- --

Signed and Sealed this
Twenty-second Day of April, 2025

Coke Morgan Stewart
*Acting Director of the United States Patent and Trademark Office*